(12) United States Patent
Wereley et al.

(10) Patent No.: US 11,221,287 B2
(45) Date of Patent: Jan. 11, 2022

(54) METHODS OF MEASURING STRUCTURAL AND FUNCTIONAL CHANGES OF A BIOMOLECULAR COMPOSITION

(71) Applicant: Purdue Research Foundation, West Lafayette, IN (US)

(72) Inventors: Steven Truitt Wereley, West Lafayette, IN (US); Tamara Lea Kinzer-Ursem, West Lafayette, IN (US); Katherine Noel Clayton, West Lafayette, IN (US); Jacqueline Callihan Linnes, West Lafayette, IN (US); Donghoon Lee, West Lafayette, IN (US); Taylor Jo Moehling, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 732 days.

(21) Appl. No.: 15/846,430

(22) Filed: Dec. 19, 2017

(65) Prior Publication Data
US 2018/0195944 A1     Jul. 12, 2018

Related U.S. Application Data

(60) Provisional application No. 62/436,081, filed on Dec. 19, 2016.

(51) Int. Cl.
| | |
|---|---|
| *G01N 33/48* | (2006.01) |
| *G01N 11/10* | (2006.01) |
| *G01N 15/14* | (2006.01) |
| *G01N 11/00* | (2006.01) |
| *G01N 13/00* | (2006.01) |
| *G06G 7/58* | (2006.01) |
| *G01N 15/00* | (2006.01) |

(52) U.S. Cl.
CPC ............. *G01N 11/10* (2013.01); *G01N 11/00* (2013.01); *G01N 13/00* (2013.01); *G01N 15/1429* (2013.01); *G01N 2011/006* (2013.01); *G01N 2011/008* (2013.01); *G01N 2013/003* (2013.01); *G01N 2015/0003* (2013.01); *G01N 2015/0053* (2013.01)

(58) Field of Classification Search
None
See application file for complete search history.

(56) References Cited

U.S. PATENT DOCUMENTS 10,794,808 B2 * 10/2020 Clayton ............. G01N 15/0227

OTHER PUBLICATIONS

F. Rubino, Nature, 2016, 533, 459-461.
L. Heinemann, J. Diabetes Sci. Technol 2008. 2(5), 919-921.
A.S. Kane, et al., Anal. Chem. 2008, 80, 9534-9541.
T.M. Sequires, et al., Annu. Rev. Fluid Mech. 2010, 42, 413-438.
T.G. Mason, et al., Physical Rev. Lett. 1997, 79, 3282-3285.
M.G. Olsen, et al., Experiments in Fluids [Suppl.] 2000, S166-S174.
G.K. Batchelor, J. Fluid Mech. 1977, 83, 97-117.
G.K. Batchelor, J. Fluid Mech. 1976, 74, 1-29.
M. Elimelech, in Particle Deposition & Aggregation: Measurement, Modeling and Simulation, 1998, pp. 93-96.
L. Livadaru, et al., Macromolecules 2003, 36, 3732-3744.
R.A. Rader, Nature Biotechnology 2008, 26, 743-751.

* cited by examiner

*Primary Examiner* — Eric S Dejong
(74) *Attorney, Agent, or Firm* — Hartman Global IP Law; Gary M. Hartman; Domenica N. S. Hartman

(57) ABSTRACT

This invention relates to a method for measuring viscosity of a fluid using particle diffusometry (PD). The method finds practical applications in detecting structural and functional changes of a biomolecular composition by comparing the viscosity change as compared with the standard of the biomolecular composition. This method may also find uses in clinical diagnosis and quality control of clinical biological medicines, food and feeds during the process of manufacturing, distribution and consumption.

20 Claims, 9 Drawing Sheets

METHODS OF MEASURING STRUCTURAL AND FUNCTIONAL CHANGES OF A BIOMOLECULAR COMPOSITION

CROSS-REFERENCE TO RELATED APPLICATIONS

The present U.S. patent application is related to and claims the priority benefit of U.S. Provisional Patent Application Ser. No. 62/436,081, filed Dec. 19, 2016, the contents of which are hereby incorporated by reference in their entirety into this disclosure.

TECHNICAL FIELD

This invention relates to a method for measuring viscosity of a fluid using particle diffusometry (PD). The method finds practical applications in detecting structural and functional changes of a biomolecular composition by comparing the viscosity change as compared with the standard of the biomolecular composition. This method may also find uses in clinical diagnosis and quality control of clinical biological medicines, food and feeds during the process of manufacturing, distribution and consumption.

BACKGROUND

This section introduces aspects that may help facilitate a better understanding of the disclosure. Accordingly, these statements are to be read in this light and are not to be understood as admissions about what is or is not prior art.

Peptide- and protein-based biological therapeutics, as compared with the traditional, orally dosed small molecule drugs, are not orally bioavailable. Those biological medical products are normally formulated as an injectable solution. Due to the inherent structural instability of those proteins and peptides, it is imperative to monitor any structural changes of those compounds during storage and transportation, and before the targeted human use. For example, human insulin is a peptide of 51 amino acid residues, which is commonly formulated as an injectable solution and widely used to treat both type I and type II diabetes.

Over 400 million people worldwide suffer from diabetes (Rubino, et al, Nature 2016, 533, 459-461). For diabetes type I and many type II patients, insulin is a biopharmaceutical widely used to maintain consistent glucose levels within the blood. Therefore, maintaining native protein folding of insulin is essential for biopharmaceutical function. In turn, the global insulin market size is expected to reach $53.04 billion by 2020. Although there is a large population affected by diabetes and therefore a growing global insulin market, there is currently no method at the point of care in which patients can determine if their insulin is still effective. Monitoring insulin efficacy is critical considering that the state of the biopharmaceutical diminishes due to both temperature and time. Present measures to determine the effectiveness of insulin include (1) patients returning their prescription to the manufacturer for examination, (2) trial injection of the drug and examining the outcome, or (3) simply purchasing a new prescription. These current approaches are either unsafe, inadequate, or come at monetary cost.

Designing miniaturized platforms for analyzing biopharmaceutical degradation provides significant advantages to current macroscale systems. These include the ability to investigate the quality of the pharmaceutical at both the sites of clinical care and patient homes while using minimal sample volumes. Current screening processes of protein-based biopharmaceuticals are inaccessible to the public since drug screening is performed in-house. Therefore, patients have no method for tracking the safety and efficacy of their pharmaceutical prescriptions—which often occurs due to incorrect storage conditions or age of the product. Since there is no existing method to study biopharmaceutical expiration at the point of care, this opens up a new research realm to develop a method to screen for the degradation of protein-based biopharmaceuticals. The present disclosure provides a practical solution to those unmet needs.

SUMMARY

This invention relates to a method for measuring viscosity of a fluid using particle diffusometry (PD). The method finds practical applications in detecting structural and functional changes of a biomolecular composition by comparing the viscosity change as compared with the standard of the biomolecular composition. This method may also find uses in clinical diagnosis and quality control of clinical biological medicines, food and feeds during the process of manufacturing, distribution and consumption.

In some illustrative embodiments, the present invention discloses a method for measuring viscosity of a liquid comprising the steps of:
  a. preparing a testing solution using said liquid with added uniformly sized particles of about 50~1,000 nm.
  b. capturing a plurality of microscopic images of said particles in said testing solution over a period of time;
  c. partitioning each of the plurality of images into interrogation regions and determining the average displacement of the particles in each of the interrogation regions of the plurality of images over said time period;
  d. determining diffusion coefficient of the particles based on the average displacement of the particles; and
  e. calculating viscosity of said liquid using determined diffusion coefficient with Einstein's diffusion equation.

In some other illustrative embodiments, the present invention discloses a method for measuring viscosity of a liquid, wherein the uniformly sized particles are made of gold, silver, polystyrene, or similar structurally stable materials. In some instance, the particles are fluoresce or isotopic labeled or magnetic.

In some other illustrative embodiments, the present invention discloses a method for measuring viscosity of a liquid, wherein the liquid is a biomolecular composition selected from the group consisting of nucleic acid, amino acid, lipid, peptide, protein, antibody, enzyme, carbohydrate, DNA, RNA, polysaccharide, oligonucleotide, oligosaccharide, proteoglycans, and glycoprotein.

In some other illustrative embodiments, the present invention discloses a method for measuring viscosity of a liquid, wherein said biomolecular composition is a biological therapeutics.

In some other illustrative embodiments, the present invention discloses a method for measuring viscosity of a liquid, wherein the method is used for measuring structural and functional changes of a biomolecular composition of testing subject from a standard thereof, comprising the steps of:
  a. measuring viscosity of the biomolecular composition of testing subject;
  b. measuring viscosity of the standard biomolecular composition of testing subject; and
  c. comparing viscosity of said biomolecular composition of testing subject with that of said standard, wherein finding of a substantial difference suggests structural and functional changes of said biomolecular composition of testing subject.

In some other illustrative embodiments, the present invention discloses a method for measuring structural and functional changes of a biomolecular composition of testing subject from a standard thereof, comprising the steps of:
a. preparing a testing solution using said biomolecular composition with added uniformly sized particles of about 50~1,000 nm.
b. capturing a plurality of microscopic images of said particles of said testing solution over a period of time;
c. partitioning each of the plurality of images into interrogation regions and determining the average displacement of the particles in each of the interrogation regions of the plurality of images over said time period;
d. determining a diffusion coefficient based on the average displacement of the particles;
e. calculating viscosity of said biomolecular composition of testing subject using the determined diffusion coefficient with Einstein's diffusion equation;
f. obtaining viscosity of a standard biomolecular composition of testing subject by repeating steps a.~e.; and
g. comparing viscosity of said biomolecular composition of testing subject and that of said standard thereof, wherein finding of a substantial difference suggests structural and functional changes of said biomolecular composition.

In some illustrative embodiments, the present invention discloses a method for measuring structural and functional changes of a biomolecular composition, wherein said biomolecular composition comprises one or more of biomolecules selected from the group consisting of amino acid, lipid, peptide, protein, antibody, enzyme, carbohydrate, DNA, RNA, polysaccharide, oligonucleotide, oligosaccharide, proteoglycans, and glycoprotein.

BRIEF DESCRIPTION OF THE DRAWINGS

Embodiments of the present disclosure will now be described by way of example in greater detail with reference to the attached figures, in which.

DETAILED DESCRIPTION

Figure 1:
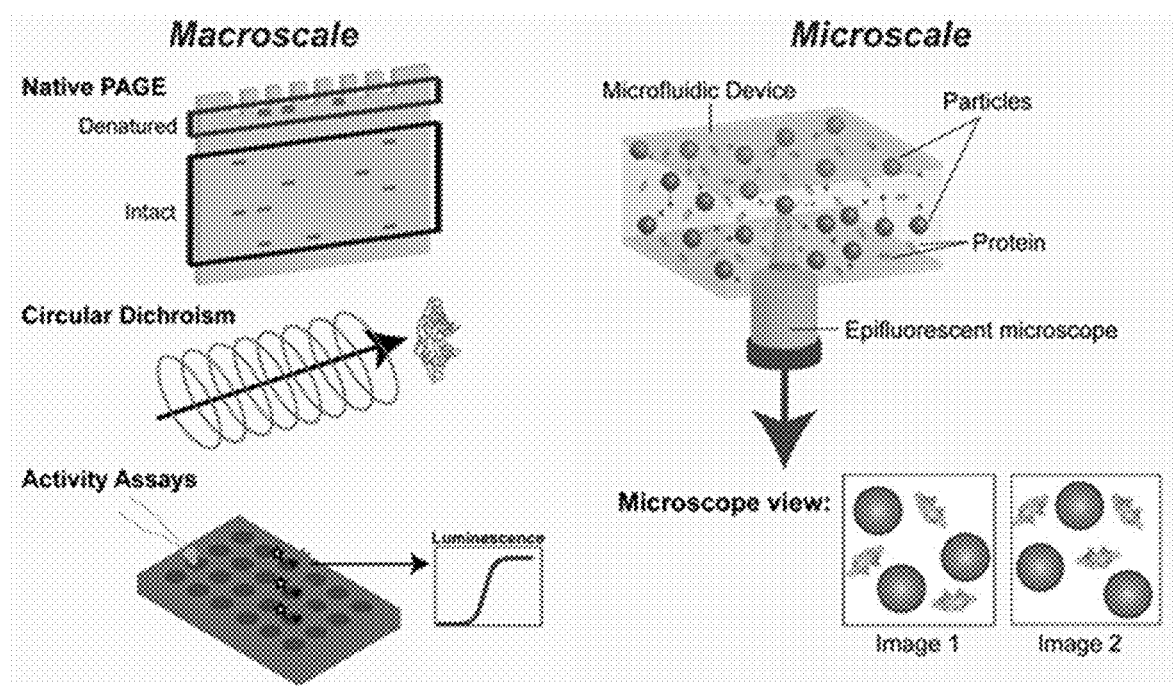
FIG. 1 describes the gold standard macroscale systems for measuring protein folding state involve methods such as native PAGE, circular dichroism, and activity assays. Conversely, particle diffusometry (PD), a microscale system, involves imaging particles suspended in a protein solution and correlating the motion to determine sample viscosity, and therefore protein folding state.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure the term "about" can allow for a degree of variability in a value or range, for example, within 20%, within 10%, within 5%, or within 1% of a stated value or of a stated limit of a range.

In the present disclosure the term "substantially" can allow for a degree of variability in a value or range, for example, within 80%, within 90%, within 95%, or within 99% of a stated value or of a stated limit of a range.

Terminology surrounding biopharmaceuticals varies between groups and entities, with different terms referring to different subsets of therapeutics within the general biopharmaceutical category. Some regulatory agencies use the terms biological medicinal products or therapeutic biological product to refer specifically to engineered macromolecular products like protein- and nucleic acid-based drugs, distinguishing them from products like blood, blood components, or vaccines, which are usually extracted directly from a biological source (Ronald A Rader, *Nature Biotechnology* 26, 743-751 (2008). In practice, biologics includes a wide range of products such as vaccines, blood and blood components, allergenics, somatic cells, gene therapy, antibody, therapeutic oligonucleotides, tissues and recombinant therapeutic proteins. Most biopharmaceuticals are classed and regulated by FDA as biologics. However, due to their similarity to products historically regulated as drugs, some simpler biopharmaceuticals are regulated as drugs, mostly recombinant hormones, for example, insulin and human growth hormone. Some overlapping exists between biopharmaceuticals and drugs. Biological medicine, biological therapeutics, and biomolecular therapeutics are used interchangeably.

As disclosed herein, the particles used in the Particle Diffusometry (PD) are beads or microbeads that we add to the testing system. Those beads can be made of any structurally stable materials. For example, uniformly sized beads of polystyrene or gold particles are commonly used in the development of the ideas disclosed in this invention. In some instances, those beads are fluorescently labeled or dyed. In some instances, the choice of the particles depends on the sensitivity needed and the imaging system employed. For example, we use 100 nm gold particles for dark field imaging, or fluorescent polystyrene particles around 200 nm for diagnostic purpose.

As disclosed herein, the captured images are transformed using Fast Fournier Transforms, then correlated using techniques that are standard digital image correlation techniques that are standard and well known in the field. MATLAB was used to carry out the transformations and digital image correlation.

This invention relates to a method for measuring viscosity of a fluid using particle diffusometry. The method finds practical applications in detecting structural and functional changes of a biomolecular composition by comparing the viscosity change as compared with the standard of the biomolecular composition. This method may also find uses in clinical diagnosis and quality control of clinical biological medicines, food and feeds during the process of manufacturing, distribution and consumption.

In some illustrative embodiments, the present invention discloses a method for measuring viscosity of a liquid comprising the steps of:
 a. preparing a testing solution using said liquid with added uniformly sized particles of about 50~1,000 nm.
 b. capturing a plurality of microscopic images of said particles in said testing solution over a period of time;
 c. partitioning each of the plurality of images into interrogation regions and determining the average displacement of the particles in each of the interrogation regions of the plurality of images over said time period;
 d. determining diffusion coefficient of the particles based on the average displacement of the particles; and
 e. calculating viscosity of said liquid using determined diffusion coefficient with Einstein's diffusion equation.

In some other illustrative embodiments, the present invention discloses a method for measuring viscosity of a liquid, wherein the uniformly sized particles are made of gold, silver, polystyrene, or similar structurally stable materials. In some instance, the particles are fluoresce or isotopic labeled or magnetic.

In some other illustrative embodiments, the present invention discloses a method for measuring viscosity of a liquid, wherein the liquid is a biomolecular composition selected from the group consisting of nucleic acid, amino acid, lipid, peptide, protein, antibody, enzyme, carbohydrate, DNA, RNA, polysaccharide, oligonucleotide, oligosaccharide, proteoglycans, and glycoprotein.

In some other illustrative embodiments, the present invention discloses a method for measuring viscosity of a liquid, wherein said biomolecular composition is a biological therapeutics.

In some other illustrative embodiments, the present invention discloses a method for measuring viscosity of a liquid, wherein the method is used for measuring structural and functional changes of a biomolecular composition of testing subject from a standard thereof, comprising the steps of:
 a. measuring viscosity of the biomolecular composition of testing subject;
 b. measuring viscosity of the standard biomolecular composition of testing subject; and
 c. comparing viscosity of said biomolecular composition of testing subject with that of said standard, wherein finding of a substantial difference suggests structural and functional changes of said biomolecular composition of testing subject.

In some other illustrative embodiments, the present invention discloses a method for measuring structural and functional changes of a biomolecular composition of testing subject from a standard thereof, comprising the steps of:
 a. preparing a testing solution using said biomolecular composition with added uniformly sized particles of about 50~1,000 nm.
 b. capturing a plurality of microscopic images of said particles of said testing solution over a period of time;
 c. partitioning each of the plurality of images into interrogation regions and determining the average displacement of the particles in each of the interrogation regions of the plurality of images over said time period;
 d. determining a diffusion coefficient based on the average displacement of the particles;

e. calculating viscosity of said biomolecular composition of testing subject using the determined diffusion coefficient with Einstein's diffusion equation;
f. obtaining viscosity of a standard biomolecular composition of testing subject by repeating steps a.~e.; and
g. comparing viscosity of said biomolecular composition of testing subject and that of said standard thereof, wherein finding of a substantial difference suggests structural and functional changes of said biomolecular composition.

In some illustrative embodiments, the present invention discloses a method for measuring structural and functional changes of a biomolecular composition, wherein said biomolecular composition comprises one or more of biomolecules selected from the group consisting of nucleic acid, amino acid, lipid, peptide, protein, antibody, enzyme, carbohydrate, DNA, RNA, polysaccharide, oligonucleotide, oligosaccharide, proteoglycans, and glycoprotein.

In one illustrative embodiment, the present invention is related to a method for measuring structural and functional changes of a biomolecular composition, wherein said biomolecular composition is prepared by combining individual components.

In one illustrative embodiment, the present invention is related to a method for measuring structural and functional changes of a biomolecular composition, wherein said biomolecular composition is derived from bodily fluids, cell cultures, environmental samples, air samples, water samples, soil samples, or other matrices that contain biomolecules.

In one illustrative embodiment, the present invention is related to a method for measuring structural and functional changes of a biomolecular composition, wherein said biomolecular composition is derived from a living organism including prokaryotic cells, eukaryotic cells, viruses, or prions.

In one illustrative embodiment, the present invention is related to a method for measuring structural and functional changes of a biomolecular composition, wherein said biomolecular composition is prepared by combining individual components.

In one illustrative embodiment, the present invention is related to a method for measuring structural and functional changes of a biomolecular composition, wherein the biomolecular composition is a therapeutics for treatment of a disease.

In one illustrative embodiment, the present invention is related to a method for measuring structural and functional changes of a biomolecular composition, wherein said biomolecular composition is a biotherapeutic formulation.

In one illustrative embodiment, the present invention is related to a method for measuring structural and functional changes of a biomolecular composition, wherein said biomolecular composition is an enzyme or an antibody formulation.

In one illustrative embodiment, the present invention is related to a method for measuring structural and functional changes of a biomolecular composition, wherein said biomolecular composition is a peptide, protein or glycoprotein formulation.

In some other illustrative embodiments, the present invention discloses a method for detecting presence of bacterial, viral, protozoa, fungal, or other parasitic contamination of a liquid, comprising the step of:
a. preparing a testing solution using said liquid with added uniformly sized particles of about 50~1,000 nm.
b. capturing a plurality of microscopic images of said micro particles of said testing solution over a period of time;
c. partitioning each of the plurality of images into interrogation regions and determining the average displacement of the particles in each of the interrogation regions of the plurality of images over said time period;
d. determining diffusion coefficient of the particles based on the average displacement of the particles;
e. calculating viscosity of said liquid using the determined diffusion coefficient with Einstein's diffusion equation;
f. obtaining viscosity of a non-contaminated standard of said liquid by repeating steps a.~e.; and
g. comparing viscosity of said liquid and that of said non-contaminated standard thereof, wherein finding of a substantial difference suggests presence of bacterial, viral, protozoa, fungal, or other parasitic contamination of said liquid.

In some illustrative embodiments, the present invention discloses a method for detecting presence of bacterial, viral, protozoa, fungal, or other parasitic contamination of a liquid, wherein said liquid is for human or animal consumption.

In some illustrative embodiments, the present invention discloses a method for detecting presence of bacterial, viral, protozoa, fungal, or other parasitic contamination of a liquid, wherein said liquid is selected from the group consisting of biological medicine, water, waste water of any source, fruit juice, vegetable juice, liquid food, and a liquid waste from a food or feed processing.

In some illustrative embodiments, the present invention discloses a method for detecting presence of bacterial, viral, protozoa, fungal, or other parasitic contamination of a liquid, wherein the method is used for quality control of biological medicines, food and feeds during the process of manufacturing, distribution and consumption.

In some illustrative embodiments, the present invention discloses a method for detecting presence of bacterial, viral, protozoa, fungal, or other parasitic contamination of a liquid, wherein the biological medicine is a biotherapeutic formulation.

In one illustrative embodiment, the present invention may be used in the quality control of a liquid formulation of the clinical medicines.

In another illustrative embodiment, the present invention may be used to monitor any bacterial and/or viral contamination of a liquid for human or animal consumption.

In one illustrative embodiment, the present invention may be configured as a portable device for quality control of a liquid formulation for human or animal consumption.

In one illustrative embodiment, the present invention may be configured as a portable device for point-of-care diagnosis of bacterial or viral infection.

Complex sample solutions with mixed conformations of biomolecules present a challenge for detection in point of care diagnostics. For example, insulin is widely used in diabetes care administered by patients themselves at home. Currently there is no method to monitor insulin at the point of care. Current gold-standard methods remain strictly in the laboratory space and at the macroscale which include techniques such as native polyacrylamide gel electrophoresis (PAGE), circular dichroism (CD), and protein activity assays. Native PAGE is a gel electrophoresis method which provides information on protein electrophoretic mobility, folding state, and sample purity. Native PAGE is widely implemented for a wide variety of protein-based studies. However, given that native PAGE is most often used by molecular biology and biochemistry researchers, it is clear that this technique is designed strictly for the laboratory space. Likewise, CD is a spectral technique involving a polarized light source to study protein conformation. This technique has been integral in furthering the investigation of protein structure and molecular interactions. Though similarly to native PAGE, CD it is not designed to be used by patients or clinicians, but rather structural biologists. Lastly, researchers are not only interesting in native protein morphology but also the activity of the protein itself. Methods used to assess protein activity involve precise reagent handling and luminescence readouts. Similarly to CD and native PAGE, activity assays are not feasible for patients to use due to the extensive training and analysis tools needed for assessment. Engineering a simple micro-scale device to study insulin degradation would provide patients with a monitoring device which could be used to track the efficacy of insulin.

Particle diffusometry (PD) has the capability to detect even minute differences in biomolecular compositions (Clayton, et al., *Biomicrofluidics* 2016, 10, 1-15). Based on the fundamental principles of diffusion, particles undergoing Brownian motion are imaged under fluorescence microscopy and particle motion is statistically quantified. Using particle diffusometry we rapidly quantify the presence of biomolecules by determining the change in the sample viscosity which is calculated through Einstein's diffusion equation. This passive viscosity measurement can be performed in micro-to-nanoliter volumes allowing particle diffusometry to be readily integrated into micro-total analysis systems.

This present invention disclosed a method to examine how intact and denatured proteins alter the viscosity of solutions using a novel particle diffusometry (PD). PD is statistically robust technique and therefore sensitive enough to experimentally determine minute changes in protein viscosity (Clayton, et al., 2016). Studying small changes in protein solutions is essential for biopharmaceutical research. By adding 200 nm fluorescent particles to a quiescent 4 µL protein solution, we calculate the diffusion coefficient of these particles. PD correlates sequential images in order to statistically determine a diffusion coefficient using only 8 seconds of data. The diffusion coefficient allows us to calculate the viscosity of these protein samples using the Stokes-Einstein equation. PD is fundamentally different than particle tracking, a technique previously used for studying passive microrheology. Particle tracking calculates individual particle trajectories and averages them to determine a diffusion coefficient (Squires, et al., *Annu. Rev. Fluid Mech.* 2010, 42(1), 413-438; Mason, et al., *Phys. Rev. Lett.* 1997, 79(17), 3282-3285). Because this particle tracking approach requires averaging many particle trajectories to determine statistically relevant results, this takes time consuming and computationally intensive. Such an approach is not feasible in providing rapid results for biopharmaceutical analysis. Algorithms which provide rapid feedback are more likely to be integrated into devices for the patient's home or at a local clinic. Therefore, PD algorithms are practical to integrate with technologies directed toward the point of care.

Here we first investigate the protein bovine serum albumin (BSA) as a proof-of-principle. BSA is a well characterized protein often used in microfluidics. Using BSA we consider how the solution viscosity changes as a function of the protein's folding state and solution concentration. We believe that denatured BSA is more viscous than its intact counterpart. Additionally, we investigate how BSA concentration alters protein viscosity measurements. Based on the initial characterization of BSA we use this knowledge to study a pharmacologically relevant protein, insulin. We apply similar methods to study insulin that we performed with BSA. However, it should be noted that insulin is both structurally and electrostatically very different than our proof-of-principle BSA system. Finally, we realize that biopharmaceutical solutions are unlikely to be fully intact or degraded. This is due to transportation from the manufacturer, aging of the prescription, or other external factors. Therefore, we combine intact and degraded insulin and study its effect on solution viscosity. Therefore, by characterizing the viscosity of insulin mixtures we can determine a limit-of-detection in which PD can determine protein degradation in a mixed sample.

Figure 2:
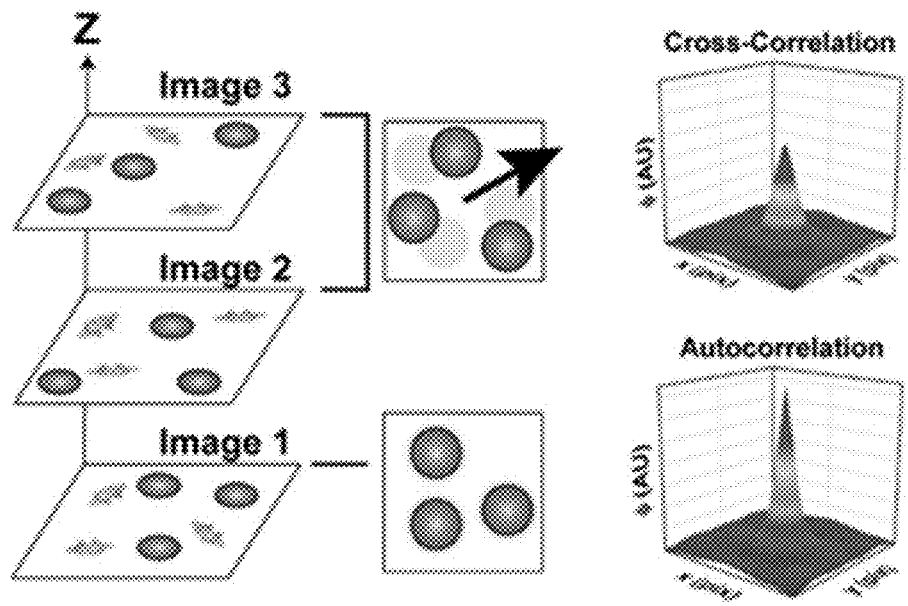
FIG. 2 shows a stack of images that are correlated with themselves produce an autocorrelation peak (Image 1). The correlation of sequential images (Image 2 with Image 3) provides the cross-correlation peaks. Note that the cross-correlation peak is both wider and shorter as compared to the autocorrelation peak.

In particle diffusometry, we calculate the diffusion coefficient of particles in solution using correlation analysis (Clayton, et al., *Biomicrofluidics* 2016, 10, 1-15). More specifically, we record a series of images of a species of particles undergoing Brownian motion in a quiescent solution (FIG. 1). Following, these images are partitioned into smaller pixel$^2$ areas, known as interrogation areas. The size of the interrogation area is defined so that there are 8-10 particles are located in each partition. To perform cross-correlation on the interrogation areas, we correlate a first image, at time t, with a second image at time t+$\Delta$t. Cross-correlation is fundamental to determine ensemble particle displacement between two sequential images (FIG. 2). The further the particle displacement during $\Delta$t, the broader the cross-correlation peak is. In order to quantify the cross-correlation peak to calculate diffusion coefficient, we determine the width of the peak, $s_a$ (pixels) at a height of 1/e. We additionally perform autocorrelation on the images. Autocorrelation instead correlates the interrogation window at time t with itself (FIG. 2). The autocorrelation peak width, $s_a$, is taller and narrower when compared to the cross-correlation peak. Using this information, we calculate the diffusion coefficient using the rearranged equation derived from Olsen and Adrian (Olsen, et al., *Exp. Fluids* 2000, 29, S166-S174):

$$D = \frac{s_c^2 - s_a^2}{16M^2 \Delta t} \quad (1)$$

where M is the magnification of the microscope objective. Because the peak width has units of pixels, using Equation 1, we can see that the squared difference in the peak widths, $s_c^2 - s_a^2$, corresponds to the change in the cross-sectional area of the correlation peak at 1/e. By experimentally determining the diffusion coefficient from the particle images, we can algebraically rearrange the Stokes-Einstein relationship (Equation 2) in order to calculate the viscosity, $\eta$, of a solution (A. Einstein, *Ann. Phys.* 1905, 17, 549).

$$\eta = \frac{kT}{6\pi Da} \quad (2)$$

where, k is the Boltzmann constant, T is the absolute temperature, and a is the hydrodynamic radius of the spheres in the protein solution. We must assume in this instance that all particles in the solvent have the same hydrodynamic radius, a, and undergoing a constant temperature, T.

We are more specifically interested in how the presence of protein and how protein folding state alters solution viscosity. Therefore, we analyze the viscosity of the solutions in terms of relative viscosity rather than the magnitude. We can measure this by algebraic manipulation of Equation 2, where $\eta_0$ is the viscosity of the solution without protein (i.e. the solvent), but does include the 200 nm particles.

$$\frac{\eta}{\eta_0} = \frac{D_0}{D} \qquad (3)$$

Particle Brownian motion was measured first in solvent to determine a baseline viscosity $\eta_0$. These particles are added to the solvent in a concentration that is high enough to obtain statistically relevant results using particle diffusometry while limiting hydrodynamic particle interactions. To determine that we limit the effect of particle-particle interactions for our viscosity measurements, we use the relationship from Batchelor for a dilute monodisperse species of particles, $$D_0 = D_{0*}(1 + k\phi) \qquad (4)$$

where $D_0$ is the effective diffusion coefficient from the addition of the polystyrene spheres, $D_{0*}$ is the diffusion coefficient of the solvent, k is the type-specific constant where we use a value of 2, and $\phi$ is the volume fraction of the particles in solution (Batchelor, *J. Fluid Mech.* 1977, 83(01), 97; Elimelech, et al., in *Particle Deposition & Aggregation: Measurement, Modelling and Simulation;* 1998; pp 93-96). From Equation 4, the percent change in the diffusion coefficient due to the introduction of particles at a concentration of $2.88 \times 10^8$ particles/mL is 0.0025%. The hydrodynamic interactions of the particles may be considered negligible when this value is less than 0.01% (Elimelech, et al., 1998).

Preparation of Proteins for Viscosity Measurements

Bovine serum albumin fraction V (Dot Scientific, Batavia, Ill.) was solubilized in 1×PBS, pH 7.4. All intact samples were maintained at 4° C. prior to imaging. To denature BSA, protein samples were heated to 95° C. for 2 hours. Additionally, three different insulin solutions were studied in this work. The first insulin solution, from bovine pancreas (Sigma Aldrich, St. Louis, Mo., USA), was solubilized in 1×PBS with 1% glacial acetic acid, pH 2.5, in accordance with manufacturer instructions. These insulin sample was used to study protein folding state in acidic conditions. The second insulin sample, also from bovine pancreas, was supplied in 25 mM HEPES, pH 8.2 (Sigma Aldrich, St. Louis, Mo., USA), and further diluted in the same buffer. This second insulin solution was used to study insulin state at slightly basic conditions. The third insulin sample was used to study the impact that PBS and HEPES would make on insulin folding state. Insulin in 25 mM HEPES was lyophilized overnight, and resuspended the solution in a 1% glacial acetic acid to lower the pH to 2.5. All intact insulin samples were stored at 4° C. prior to imaging. Denaturation of insulin occurred by heating samples at 95° C. for 2 hours. Further, to determine the sensitivity of insulin degradation in sample, mixtures of intact and denatured insulin at both pH 8.2 and 2.5 were combined volumetrically at 100:0, 90:10, 80:20, 70:30, 60:40, 50:50, 40:60, 30:70, 20:80, 10:90, and 100:0, v/v, denatured:native.

A280 spectral reading is used to determine all protein concentrations. Each protein sample was measured three times on a Nanodrop 2000 (Thermo Scientific, Erie, N.Y., USA) and measurements were averaged to determine final protein concentration.

Native polyacrylamide gel electrophoresis (PAGE) was performed as a gold-standard method to determine protein folding state. Protein samples mixed with 4× native loading buffer were introduced to precast polyacrylimide gels (Mini-PROTEAN TGX, Bio-rad, Hercules, Calif., USA). Gels was developed at 120V for 1 hour and 20 minutes in 4° C., followed by staining in GelCode™ blue (ThermoFisher Scientific, Erie, N.Y., USA) for thirty minutes, and de-stained in deionized water overnight. All protein gels were imaged on a LI-COR Odyssey (Lincoln, Nebr., USA).

Performing Experimental Particle Diffusometry Measurements

Particles of 200 nm (Fluoro-max red dyed aqueous spheres, Thermo Scientific, Erie, N.Y., USA) were washed in either HEPES pH 8.2 or 1×PBS prior to use by centrifugation at 13,000×g for 15 minutes. Washed particles were added to protein solutions immediately prior to imaging at a final particle concentration of $2.88 \times 10^8$ particles/mL. All protein solutions were stored at 4° C. prior to imaging.

A simple fluid well was made by punching a 6 mm diameter through hole (120 μm thickness) in double-sided tape (Therm-O-Web, Wheeling, Ill.) and adhering the tape to a cover glass slide (thickness no. 1, Thermo Scientific, Erie, N.Y., USA). 3 μL of sample (protein solution plus nanoparticles) was introduced to the fluid well and sealed off with a second piece of cover glass, limiting convective evaporation. The sample was imaged using an inverted fluorescence microscope (Nikon TE-2000 U, Nikon, Japan) equipped with an X-cite lamp with 40× magnification. Images were recorded using a PCO 1600 CCD camera (PCO, Kelheim, Germany) with an 800×800 pixel2 imaging window with 2×2 binning at 12.5 fps at the vertical middle plane of the chip (to ensure that particle diffusion was unhindered by the glass slides). We experimentally determined that a frame rate of 12.5 fps was rapid enough to capture particle Brownian motion but slow enough to allow the particles to displace measurably between consecutive frames. We imaged particle motion in 3 separate spatial locations of the fluid well to account for any spatial inhomogeneity that may occur. In each of these locations we made measurements at 3 different time-points to account for any temporal inhomogeneity. This approach provides us with a global view of viscosity measurements and any potential variations in it.

As this method uses volumetric illumination, all particles in the field of view were imaged, including those in front of and behind the microscope focal plane. However, as particles get farther from focus, their contribution to the correlation function decreases in a known way according to an expression derived by Meinhart et al. (Meinhart, et al. *Meas. Sci. Technol.* 2000, 11, 809-814). The effective measurement depth here (depth of correlation in PIV literature) is calculated to be 4.2 μm. This depth of correlation is located at a distance where the peak intensity of the particle image is found to be less than 1% of the peak intensity when the particle is perfectly in focus. Particle images were processed and auto and cross-correlation was performed using an in-house MATLAB code in order to determine the diffusion coefficient. 64×64 pixel$^2$ interrogation windows containing, on average, 8-10 particles were used for 100 image frame stacks (~8 seconds of data) for a high signal-to-noise ratio while maintaining a statistically relevant number of data points. Nine repetitions, where 100 images constituted an individual measurement, were performed for every individual sample. A two-dimensional Gaussian curve fit was used to calculate the orthogonal profile of the auto- and cross-correlation peaks for both the XZ- and YZ-planes. The width of the correlation peak is defined by 1/e and the width of the XZ- and YZ-Gaussian curves are averaged as one peak width value. To compare all viscosity measurements from the PD measurements, student t-tests were performed between each and every measurement. A 95% confidence interval ($\alpha=0.05$) was used with a Bonferroni adjustment of $\alpha/n$ Lower Limit of Detection Measurement The lower limit of detection (LLOD) was calculated according to the equations found in literature.39,40 First, the limit of blank (LOB) was calculated by:

$$\text{LOB} = \text{mean}_{blank} + 1.645(\text{SD}_{blank}) \quad (5)$$

where the $\text{mean}_{blank}$ is the mean value of the viscosity of 200 nm particles in buffer (sans protein), and $\text{SD}_{blank}$ is the standard deviation of that same sample. From calculating the LOB we calculate the LLOD as:

$$\text{LLOD} = \text{LOB} + 1.645(\text{SD}_{low\ concentration\ sample}) \quad (6)$$

where the $\text{SD}_{low\ concentration\ sample}$ is the standard deviation of a low concentration analyte, here being the viscosity measurement of the lowest concentration of the protein measured with PD for every data set. Therefore, our LLOD is expressed as a relative viscosity value.

Non-Specific Protein Adsorption on Particles

To determine the extent of BSA nonspecific adsorption onto the 200 nm particle surface, particles suspended in all concentrations of the BSA solutions studied (0.01-10 mg/mL) at a final volume of 100 µL were incubated together for 1 hour. The particle-protein solutions were centrifuged at 13000×g and resuspended in 100 µL three times, with a final resuspension in a final volume of 15 µL of 1×PBS. This procedure was performed in triplicate. Particles were then combined with 4×SDS-PAGE loading buffer and boiled at 95° C. for 5 minutes. Samples were run on an SDS-PAGE gel for 1 hour and 20 minutes at 120 V at room temperature. The SD-SPAGE gel was stained with coomassie (GelCode Blue, ThermoFisher Scientific, Erie, N.Y., USA) for thirty minutes with gentle rocking followed by destaining in deionized water overnight. Gels were imaged with a LI-COR Odyssey. To compare the levels of protein present in the SDS-PAGE samples, the integrated pixel intensity of each protein band was found using LI-COR Odyssey system software. The integrated pixel intensity was used to back calculate concentrations of protein present in the band by also running known BSA "standards" at concentrations of 0.005, 0.0075, 0.01, 0.05, 0.1, and 0.25 mg/mL. The values for different protein concentrations from the SDS-PAGE gels for denatured and native protein were compared with a Tukey multiple comparison two-way ANOVA with a confidence level of 95%. The two-way ANOVA investigated how either native versus denatured protein affected adsorption to the particles as well as how different concentrations affect protein adsorption.

FITC Staining of Protein on Particles

Protein-particle solutions were stained in fluorescein isothiocyanate (FITC) to visually confirm protein content in the particle solution under fluorescence microscopy. FITC was dissolved at 1 mg/mL in DMSO prior to staining. Particle-protein solutions were adjusted to 0.1 M sodium carbonate. The 1 mg/mL dissolved FITC was added to the protein-particle solution at a 1:20 v/v, respectively, and incubated in the dark by rotation for 8 hours at 4° C. Following, $NH_4Cl$ was added to the aliquots to a final volume of 50 mM and incubated in the dark by rotation for 2 hours at 4° C. For washing off excess protein to analyze nonspecifically adsorbed protein on the particle surface, particles were washed three times by centrifugation at 13 000×g and suspended to their same initial volume in 1×PBS. The fluorescent stained samples were imaged using the inverted fluorescence microscope (Nikon TE-2000U, Nikon, Japan) equipped with an X-cite lamp with 40× magnification on an Alexa 488 filter cube. Images were recorded with a DS2 camera (Nikon, Japan) and NIS Elements software (Nikon, Japan).

Results and Discussion

Investigating the Viscosity of BSA Solutions

Figure 3A:
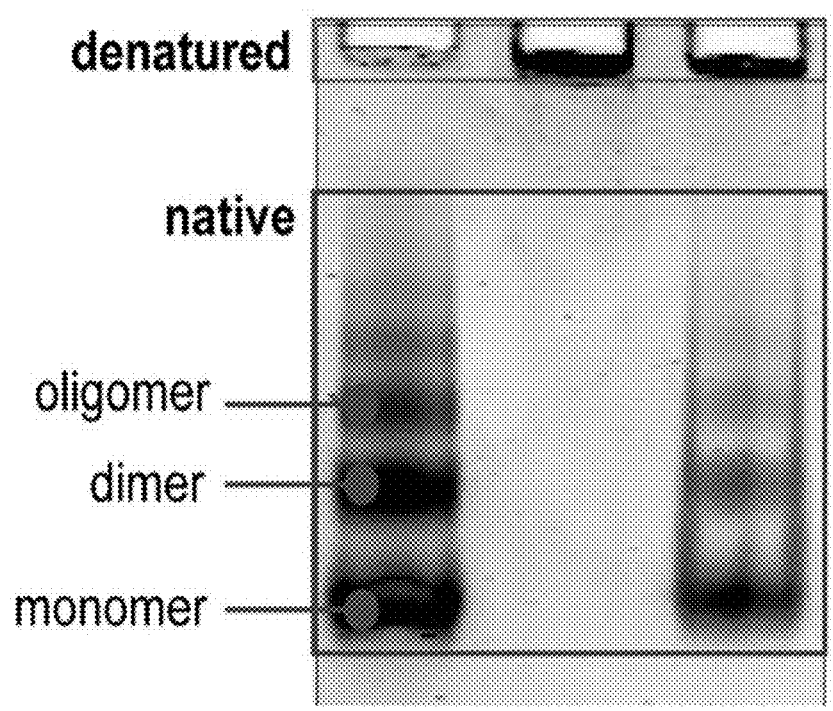
FIG. 3A is a native polyacrylamide gel electrophoresis (PAGE) of native and denatured BSA at a concentration of 0.25 mg/mL. The denatured BSA remains at the channel entrance of the gel (top, red box) and native samples propagate into the gel (bottom, blue box). The left lane contains only native BSA, the middle lane contains only heat treated, denatured BSA, and the third, rightmost lane contains a mixture of 50% native and 50% degraded BSA.

BSA is used as a model protein to perform protein viscosity characterization studies in the PD system. The two initial parameters of interest are the effect of (1) concentration and (2) folding state of BSA on solution viscosity. To investigate the differences between native and denatured BSA, we perform a native PAGE on solutions of BSA at 0.25 mg/mL with and without heat treatment (FIG. 3A). As a consequence of aggregation that occurs among semiflexible polypeptide chains during heat denaturation, the denatured BSA is not electrophoretically mobile as it is too large to penetrate through the polyacrylamide gel. In contrast, native BSA displays several distinct bands at molecular weights that likely correspond to the presence of monomers, dimers, and oligomers in the BSA solution (Seyedmohammad, et al., Biosci. Rep. 2016, 32(2), 1-13). A solution of denatured and native BSA solution at a 1:1 v/v ratio shows features of both electrophoretically immobile denatured BSA and the presence of BSA monomers, dimers, and oligomers (FIG. 3A).

Figure 3B:
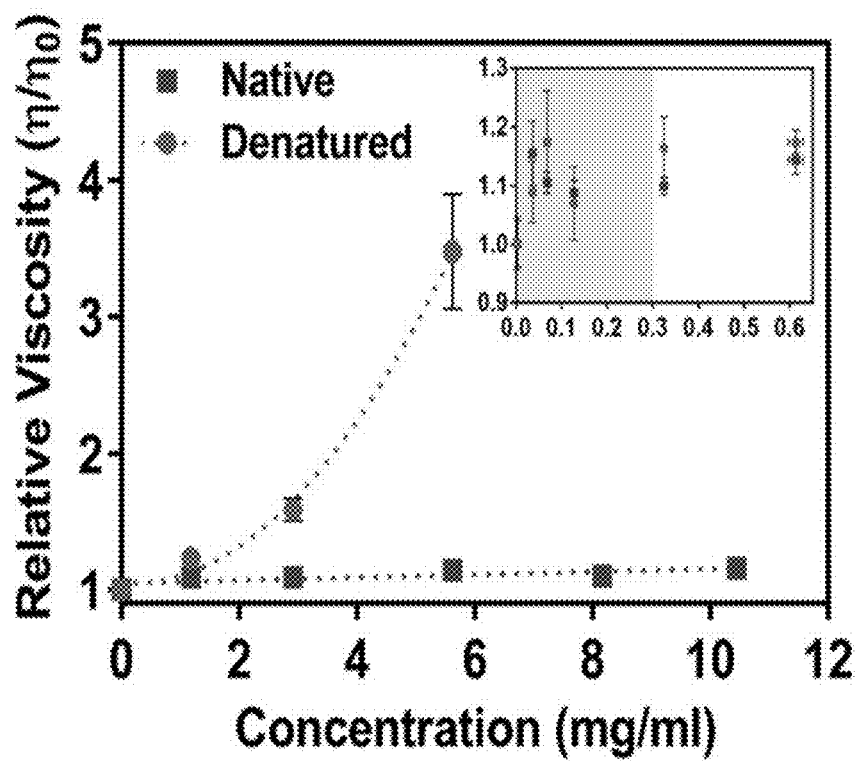
FIG. 3B shows the PD measurement of the viscosity of BSA solutions relative to the buffer solution. The relative viscosity of denatured BSA solutions (red circles) increases as the concentration of the protein increases, whereas the viscosity of solutions containing native protein (blue squares) remains constant as a function of concentration. The viscous effects from lower protein concentrations are statistically indistinguishable from one another as both a function of concentration and protein folding state (inset, highlighted in the peach region); n=9.

Measurements of the relative viscosity of solutions of BSA with and without heat treatment were performed using PD (FIG. 3B). Measurements of heat denatured BSA solutions could only be performed up to a concentration of 5 mg/mL as gelling occurred in samples above this concentration, causing significant errors in pipetting. We observe that the viscosity of denatured BSA solutions dramatically increases as a function of concentration (FIG. 3B). PD can be used to determine differences in viscosity between solutions of native and denatured BSA at concentrations of approximately 0.3 mg/mL and greater (p<0.001 for 0.3 and 0.6 mg/mL and p<0.0001 for 1 mg/mL and greater), raw PD data in Tables 1 and 2).

TABLE 1

Relative BSA Viscosity Measurements (Low Concentrations).
Raw data values for the relative viscosity of low concentrations
of native and denatured BSA using PD (inset on FIG. 3B).

| Concentration (mg/ml) | 0.003 ± 0.000 | 0.036 ± 0.004 | 0.068 ± 0.007 | 0.127 ± 0.003 | 0.324 ± 0.003 | 0.613 ± 0.016 |
|---|---|---|---|---|---|---|
| Native | 1.00 ± 0.04 | 1.16 ± 0.05 | 1.11 ± 0.02 | 1.09 ± 0.02 | 1.10 ± 0.02 | 1.14 ± 0.02 |
| Denatured | 1.00 ± 0.04 | 1.09 ± 0.05 | 1.17 ± 0.09 | 1.07 ± 0.06 | 1.17 ± 0.05 | 1.18 ± 0.02 |

TABLE 2

Relative BSA Viscosity Measurements (High Concentrations). Raw data values for the relative viscosity of high concentrations of native and denatured BSA using PD (FIG. 3B).

| Concentration (mg/ml) | 1.184 ± 0.011 | 2.914 ± 0.035 | 5.622 ± 0.007 | 8.170 ± 0.019 | 10.451 ± 0.079 |
|---|---|---|---|---|---|
| Native | 1.09 ± 0.02 | 1.09 ± 0.02 | 1.14 ± 0.04 | 1.10 ± 0.02 | 1.16 ± 0.03 |
| Denatured | 1.23 ± 0.05 | 1.59 ±+ 0.08 | 3.48 ± 0.42 | N/A | N/A |

TABLE 3

Integrated Intensity Measurements.*

| Concentration (mg/ml) | 0.003 ± 0.000 | 0.036 ± 0.004 | 0.068 ± 0.007 | 0.127 ± 0.003 | 0.324 ± 0.003 | 0.613 ± 0.016 |
|---|---|---|---|---|---|---|
| Native post-wash (mg/ml) | 0.003 ± 0.001 | 0.012 ± 0.004 | 0.011 ± 0.010 | 0.010 ± 0.003 | 0.020 ± 0.016 | 0.014 ± 0.013 |
| Denatured post wash (mg/ml) | 0.003 ± 0.001 | 0.006 ± 0.001 | 0.008 ± 0.004 | 0.014 ± 0.008 | 0.024 ± 0.029 | 0.005 ± 0.004 |

| Concentration (mg/ml) | 1.184 ± 0.011 | 2.914 ± 0.035 | 5.622 ± 0.007 | 8.170 ± 0.019 | 10.451 ± 0.079 |
|---|---|---|---|---|---|
| Native post-wash (mg/ml) | 0.012 ± 0.009 | 0.018 ± 0.014 | 0.024 ± 0.008 | 0.015 ± 0.008 | 0.011 ± 0.012 |
| Denatured post wash (mg/ml) | 0.050 ± 0.083 | 0.142 ± 0.236 | 0.054 ± 0.070 | N/A | N/A |

*LI-COR Odyssey software is used to determine the integrated intensity and back calculate the amount of nonspecifically adsorbed BSA onto polystyrene surfaces post-washing. All calculations were based on a standard curve of integrated intensity bands on an SDS-PAGE of known BSA concentrations of 0.005, 0.0075, 0.01, 0.05, 0.1, and 0.25 mg/ml ($R^2$ = 0.99). All values are normalized by the integrated intensity signal measured from the background signal of the SDS-PAGE gel.

For native BSA, we observe no increase in the solution viscosity at increasing BSA concentrations (p-value>0.05). We experimentally measure the lower limit of detection (LLOD) needed to differentiate between native and denatured BSA. The LLOD, measured as the relative viscosity, is a value of 1.12; in this case meaning that PD can measure the viscosity of denatured BSA at concentrations of 0.3 mg/mL and greater. However, this LLOD will change depending on the pH and buffer conditions which BSA is subjected to. Further, individual native BSA proteins, like other globular proteins, can be modeled as hard rigid spheres moving in space. On the other hand, denatured BSA, similarly to other denatured proteins, is likely better-described as a discrete semiflexible polymer (Livadaru, et al., *Macromolecules*, 2003, 36, 3732-3744; Choi, et al., *Structure*, 2011, 19, 566-576). Thus we speculate that the non-linear trend of increasing viscosity with increasing concentration of denatured protein in FIG. 3B is likely due to increases in unfolded protein aggregation at increasing concentrations.

To validate the PD measurements, we use microrheology to measure BSA solution viscosity and correlate the results with the PD outputs. Microrheology is an established method for passive viscosity measurements applying the fundamentals of particle tracking (Josephson, et al. *J. Rheol.* 2016, 60, 531-540; Squires, et al, *Annu. Rev. Fluid Mech.* 2010, 42, 413-438). The PD and microrheology BSA solution viscosity measurements are positively correlated (Clayton, et al., *Lab Chip*, 2017, 17, 4148-4159). For denatured solutions, the Pearson's correlation coefficient between microrheology and PD are 0.96. The correlation of the native solution viscosity measurements has a Pearson's correlation coefficient of 0.78. The lower correlation coefficient in native BSA solutions is to be expected based on the assumptions used in colloidal-based microrheology measurements. Microrheology assumes a uniform charge distribution for globular proteins; however, this assumption fails for proteins like BSA (Amin, et al., *Curr. Opin. Colloid Interface Sci.* 2014, 19, 438-449). This would lead to a larger discrepancy between measurements (lower Pearson's correlation coefficient). The implications of the differing correlations for native versus denatured solution viscosity potentially indicates higher variability in measurements for microrheology and possibly for PD.

Non-Specific Protein Adsorption on Viscosity Measurements

Figure 4A:
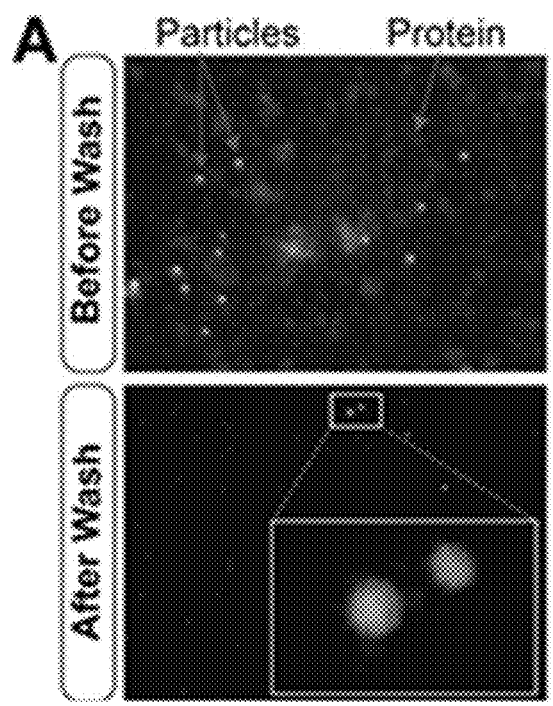
FIG. 4A shows analysis of nonspecific protein adsorption on particle surfaces. Prior to washing, particles in the presence of 5 mg/mL. FITC labeled BSA show green fluorescent background signal, indicating free protein (top). After washing (bottom) the background fluorescent signal is dramatically reduced as expected, with concentrated fluorescent green signal located around the red particle circumference indicating non-specific adsorption of FITC-BSA to the particles.

The relative change in solution viscosity that we calculate in FIG. 3B may not be a function of protein denaturation alone. Particles without chemical surface modifications are likely to have non-specific adsorption of proteins to their surfaces, thus increasing the particles' hydrodynamic radii (Clayton, et al., *Biomicrofluidics* 2016, 10, 1-15). As a particle's radius increases, its diffusion coefficient decreases according to the Stokes-Einstein equation. We see the particle size may be increasing in the presence of BSA. The LLOD is found to be at a relative viscosity of 1.12, indicating that the solution viscosity of denatured BSA would have to be 1.12 times greater than the bare 200 nm particle size to see a statistically significant signal difference. Therefore, the effect of low levels of protein adsorption onto particle surfaces, even at low protein concentrations and regardless of protein folding state, may contribute to lower sensitivity of the PD measurement. To study the effect that non-specific adsorption of proteins onto our particles has on PD measurements, we first investigate whether or not native BSA non-specifically adsorbs onto unmodified particle surfaces. Polystyrene particles were incubated with fluorescently labeled FITC-BSA, imaged, washed to remove the excess BSA, and imaged again to visualize any remaining fluorescent protein that is attached to the particle surface (FIG. 4A). In FIG. 4A it is evident that in the unwashed sample FITC-BSA is dispersed throughout, as indicated by green fluorescence (FITC). After removing the free BSA, the FITC signal is localized to the particle surfaces. This confirms that non-specific adsorption of BSA is, in fact, occurring on these unmodified red fluorescent polystyrene spheres.

Figure 4B:
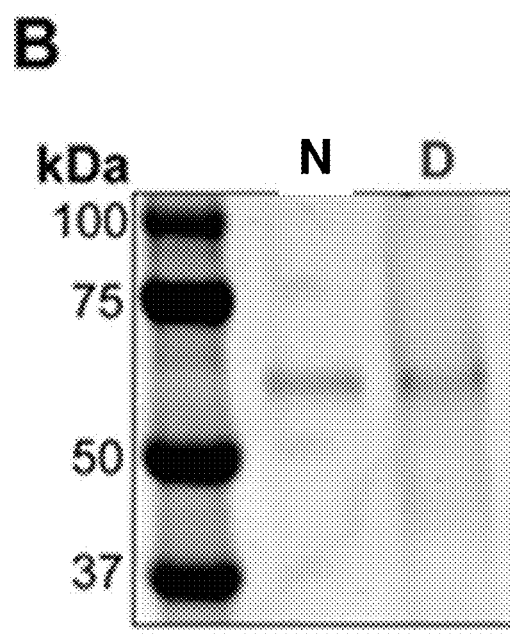
FIG. 4B presents the SDS-PAGE analysis of the 5 mg mL-1 BSA sample non-specifically absorbed to beads for both native (N) and denatured (D) BSA samples indicate similar levels of non-specific adsorption.

We perform a semi-quantitative SDS-PAGE analysis to determine the degree of which BSA non-specifically adsorbed to the particle surface between different sample groups. Particles are incubated with either native or denatured BSA solutions at varying protein concentrations (0.01-10 mg/mL), washed, boiled in the presence of SDS, and analyzed. SDSPAGE analysis of the boiled protein-particle samples shows that the protein can be stripped from the particles and visualized with coomassie (FIG. 4B). From the SDS-PAGE, the integrated pixel intensities of all the protein bands are measured with image processing (values in Table 3) and are compared using a two-way ANOVA with a post-hoc Tukey test to determine if protein folding state or protein concentration have an effect on non-specific adsorption onto the particle surface. We find no statistically significant difference (p-value>0.05) among the integrated pixel intensity values of the protein bands for native BSA and denatured BSA, respectively at all concentrations. This indicates that protein folding state does not change the amount of protein non-specifically adsorbed to the particle. Furthermore, the integrated intensity values of the SDS-PAGE bands at all concentrations (0.01-10 mg/mL) relative to one another are also not statistically significantly different (p-value>0.05), indicating that concentration does not play a role of the quantity of non-specific protein adsorption onto the particles. Together we take these results to mean that similar amounts of protein non-specifically adsorb onto particle surfaces regardless of folding state (denatured vs. native protein) or concentration of protein in solution. Thus, we assume that all particles, regardless of protein treatment, undergo the same surface adsorption, and the differences in diffusion coefficient that we measure with PD indicates changes in the viscosity of the protein-particle solutions, rather than differences in particle size due to non-specific adsorption. This also indicates that differences in solution viscosity at lower protein concentrations maybe obtainable with particle surface modifications that are meant to block non-specific adsorption.

Viscosity Measurements of Insulin Solutions

Having determined that PD can readily determine differences of viscosity between native and denatured BSA solutions, we sought to characterize the change in solution viscosity of native and denatured state of a more pharmacologically relevant protein, insulin. Insulin has vastly different physiochemical properties than BSA. The molecular weight of insulin is 5.8 kDa (BSA is 66.5 kDa) and is a heterodimer comprised of separate $\alpha$ and $\beta$ subunits. When insulin is denatured, the protein separates into its two respective subunits due to the breakage of disulfide bonding separating into two 21 and 30 amino acid polypeptide chains, respectively. In contrast, BSA when unfolded is a single 607 amino acid polypeptide chain.

There are currently multiple formulations of insulin produced by biopharmaceutical companies. As many of these formulations are proprietary and the exact formulation is not public information, we measured the viscosity of insulin solutions comprised of different buffers (HEPES and PBS) at two different pH values (2.5 and 8.2). Therapeutic insulin is often found at different pH depending on the application. In our work, we use a pH of 2.5 and 8.2 first to follow manufacturer's instructions for protein dilution and resuspension. These pHs are also relevant in a clinical setting. A pH of 8.2 is often used for therapeutic insulin crystals. Further, a pH of 2.5 is used, by USP guidelines, for acidified insulin.

Figure 5A:
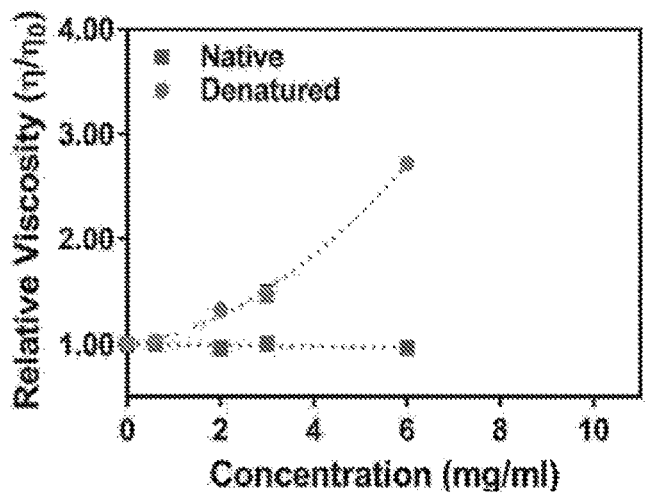
FIG. 5A shows the relative viscosity of denatured insulin increases as the concentration of the protein increases in PBS (1×) at pH 2.5, where there is a dramatic difference in the viscosity of denatured insulin at 2 mg/mL.
Figure 5B:
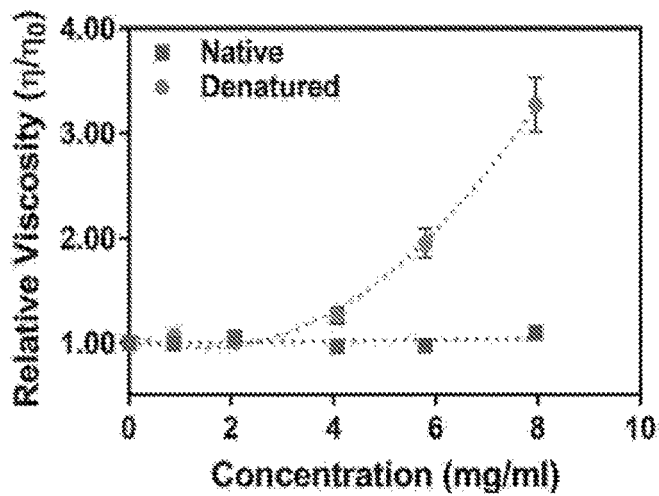
FIG. 5B shows native insulin solubilized in HEPES at pH 2.5, where there is a statistically significant difference in viscosity at a concentration of 4 mg/mL.
Figure 5C:
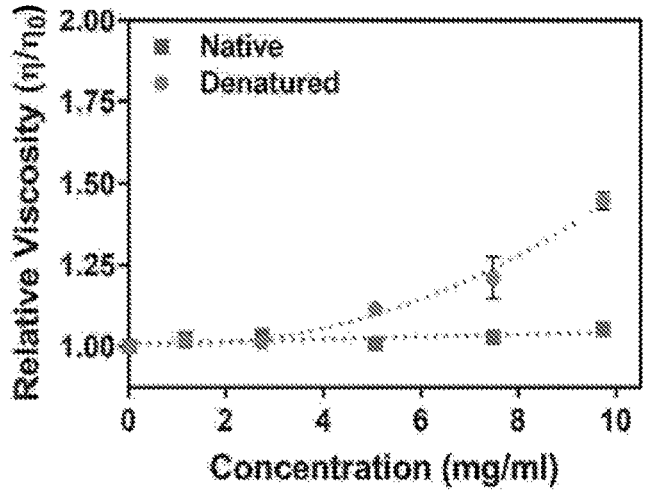
FIG. 5C shows insulin samples in HEPES at pH 8.2 where there is the least dramatic difference in viscosity of insulin, but nonetheless there is a non-linear increase in solution viscosity for denatured protein sample; n=9.

Proper folding of insulin in PBS pH 2.5 was verified by native PAGE. The relative viscosities of native and degraded insulin at varying concentrations are measured using PD (FIG. 5A-5C). We observe that, similar to BSA, the viscosity of denatured insulin solutions dramatically increases as the concentration of the protein increases (raw data in Table 4). From this the experimentally measured LLOD of insulin in PBS is at a relative viscosity of 1.09, which is similar to our measurement for BSA LLOD (1.12). This relative viscosity measurement occurs at a concentration of denatured insulin in PBS pH 2.5 somewhere below 2 mg/mL, indicating that we can detect significant differences in the viscosity of denatured compared to native insulin at concentrations of 2 mg/mL and greater (p<0.0001, FIG. 5A), but not below.

Interestingly, changes in the relative viscosity of denatured insulin as a function of concentration varies with buffer and pH. After performing the insulin viscosity study in PBS, PD is used to assess the viscosity of insulin in HEPES pH 2.5. Significant differences in the viscosity of denatured and native insulin are detectable at concentrations of 4 mg/mL and greater when solubilized in HEPES at pH 2.5 (FIG. 5B). The LLOD of PD measurements of the relative insulin viscosity of HEPES pH 2.5 is 1.07, which occurs at the 4 mg/mL denatured protein concentration. PD measurements of relative viscosity of native insulin in HEPES pH 2.5 do not significantly vary as a function of concentrations (PD data in Table 5). The measurements of BSA and insulin in 1xPBS at pH 2.5 and insulin in HEPES at pH 2.5 suggest that PD can be used to measure changes in relative viscosity with a LLOD of 1.12.

TABLE 4

Relative Viscosity of Insulin in PBS. Raw data values for the relative viscosity of native and denatured insulin suspended in 1X PBS pH 2.5 using PD (FIG. 5A).

| Concentration (mg/ml) | 0.00 ± 0.00 | 0.61 ± 0.04 | 2.06 ± 0.07 | 3.1 ± 0.02 | 6.12 ± 0.08 |
|---|---|---|---|---|---|
| Native | 1.00 ± 0.03 | 1.01 ± 0.04 | 0.96 ± 0.03 | 1.01 ± 0.04 | 0.97 ± 0.02 |
| Denatured | 1.00 ± 0.01 | 1.03 ± 0.01 | 1.33 ± 0.06 | 1.48 ± 0.07 | 2.72 ± 0.06 |

TABLE 5

Relative Viscosity of Insulin in HEPES pH 2.5. Raw data values for the relative viscosity of native and denatured insulin suspended in 2.5 mM HEPES pH 2.5 using PD (FIG. 5B).

| Concentration (mg/ml) | 0.00 ± 0.00 | 0.88 ± 0.06 | 2.08 ± 0.01 | 4.08 ± 0.11 | 5.80 ± 0.05 | 7.96 ± 0.03 |
|---|---|---|---|---|---|---|
| Native | 1.00 ± 0.03 | 0.99 ± 0.03 | 1.05 ± 0.04 | 0.97 ± 0.03 | 0.97 ± 0.02 | 1.09 ± 0.03 |
| Denatured | 1.00 ± 0.03 | 1.07 ± 0.05 | 1.00 ± 0.04 | 1.26 ± 0.08 | 1.95 ± 0.14 | 3.27 ± 0.26 |

TABLE 6

Relative Viscosity of Insulin in HEPES pH 8.2. Raw data values for the relative viscosity of native and denatured insulin suspended in 2.5 mM HEPES pH 8.2 using PD (FIG. 5C).

| Concentration (mg/ml) | 0.02 ± 0.01 | 1.17 ± 0.04 | 2.74 ± 0.08 | 5.07 ± 0.01 | 7.48 ± 0.05 | 9.73 ± 0.04 |
|---|---|---|---|---|---|---|
| Native | 1.00 ± 0.02 | 1.02 ± 0.01 | 1.03 ± 0.02 | 1.01 ± 0.01 | 1.03 ± 0.02 | 1.05 ± 0.02 |
| Denatured | 1.00 ± 0.02 | 1.02 ± 0.02 | 1.01 ± 0.00 | 1.12 ± 0.01 | 1.21 ± 0.06 | 1.45 ± 0.03 |

We also measured the relative viscosity of insulin solutions in HEPES pH 8.2. Measured changes in relative viscosity of denatured insulin show a much less drastic nonlinear increase in viscosity at increasing concentrations as compared to the PBS and HEPES pH 2.5 cases. In the HEPES pH 8.2 buffer condition, PD measures the difference in viscosity between native and degraded insulin at a concentration of 5 mg/mL and greater (p<0.0001, FIG. 5C) which is where PD reaches its LLOD. Additionally, following the same trend as the PBS and HEPES pH 2.5 cases, there is no discernible change in relative viscosity between all concentrations of native insulin in HEPES pH 8.2 over the range of concentrations measured (PD data in Table 6). Taking these results together, we see that that denatured insulin solubilized in buffers which are closer to physiological pH have less dramatic measurable changes in viscosity. Likewise, the buffer/salt content, such as PBS versus HEPES, has an effect on the viscosity of denatured insulin solutions as well, suggesting that PD can detect how the solubility of denatured protein changes as a function of changes in buffer conditions.

We attribute these differences in changes in relative viscosity to the interaction of the denatured protein with the various ions and salts in the different buffer and pH solutions. Ion and salt content of solutions are known to affect protein morphology, interacting with the exposed amino acid side chains of the proteins to either shield or change individual amino acid charge. The isoelectric point of insulin is pH 5.4; thus the overall charge of insulin is positive in the acidic pH and negative in the basic buffer. These molecular interactions are likely having a direct effect on how the denatured polypeptide chains of insulin are interacting with each other in solution, and in turn, affecting measurements of solution viscosity obtained with PD. Additionally, at the pH of 2.5 the insulin has a net positive charge. At this pH the insulin could interact electrostatically with the negatively charged 200 nm particles (zeta potential of −40 mV). On the other hand, insulin at pH 8.2 has a net negative charge and could exhibit repulsive interactions with the particles. This effect could also be attributing to differences in the viscosity measurements, where the insulin suspended in solutions with pH values below the isoelectric point can be expected to exhibit greater viscosity changes than those suspended in solutions with a pH above the isoelectric point. We conclude that buffer conditions play a major role in the viscosity of denatured protein solutions, and speculate that different biopharmaceutical formulations of insulin would have different absolute viscosity measurements. Regardless, as the concentration of degraded insulin in a sample increases, the relative viscosity of the solution is expected to markedly increase to detectable levels.

Studies of Mixtures of Insulin

Figure 6A:
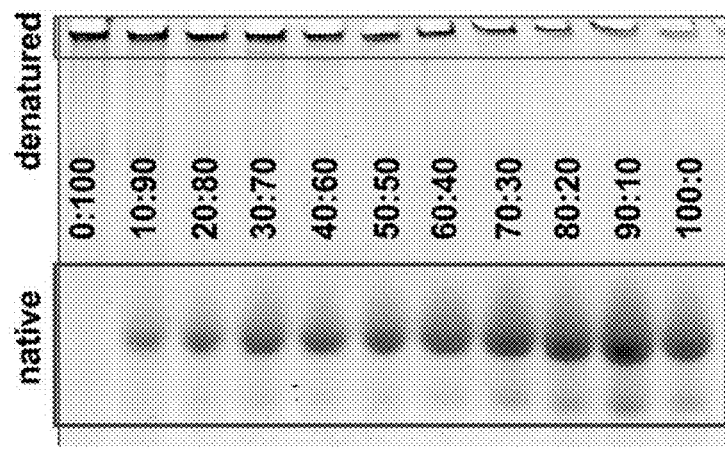
FIG. 6A shows a native PAGE of different mixtures of native and denatured insulin, where more denatured insulin produces a higher viscosity.

Prescription insulin is stored at concentrations between 100 units per mL to 200 units per mL, which is equivalent to 3.5-7 mg/mL, assuming all insulin is native at the time of manufacturing and packaging. However, it is unlikely in practice that prescription insulin will be either 100% degraded or 100% native. In fact, many studies indicate that a potency of >95% is found to be acceptable for biotherapeutic insulin (Kerr, et al., J. Diabetes Sci. Technol. 2013, 7, 1595-1606). We therefore sought to measure the changes in relative viscosity of mixtures of varying ratios (v/v) of native and denatured insulin at a consistent concentration of 6 mg/mL (to remain within the range of prescription insulin). Like BSA (FIG. 3A) most denatured insulin does not enter the PAGE gel, and remains at the entrance to the gel channel (FIG. 6A, red box), indicating aggregation of denatured protein. In contrast, the native protein is electrophoretically mobile and moves into the PAGE gel (FIG. 6A, blue box). Consistent with the varying ratio of native to denature insulin, higher intensity bands within the gel channel are present in insulin mixtures containing larger ratios of native insulin, whereas higher intensity bands at the channel entrance correlate with larger volumes of denatured insulin.

Figure 6B:
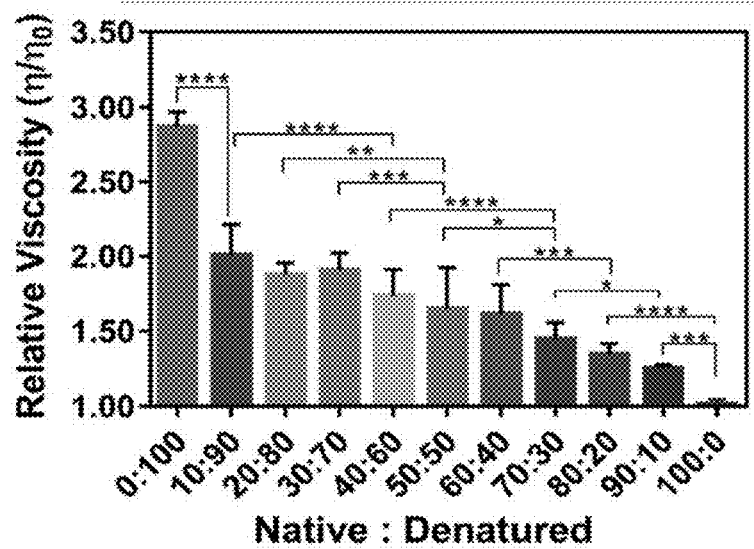
FIG. 6B shows the relative viscosity of different mixtures of native and denatured insulin in PBS at pH 2.5 (v/v ratio)
Figure 6C:
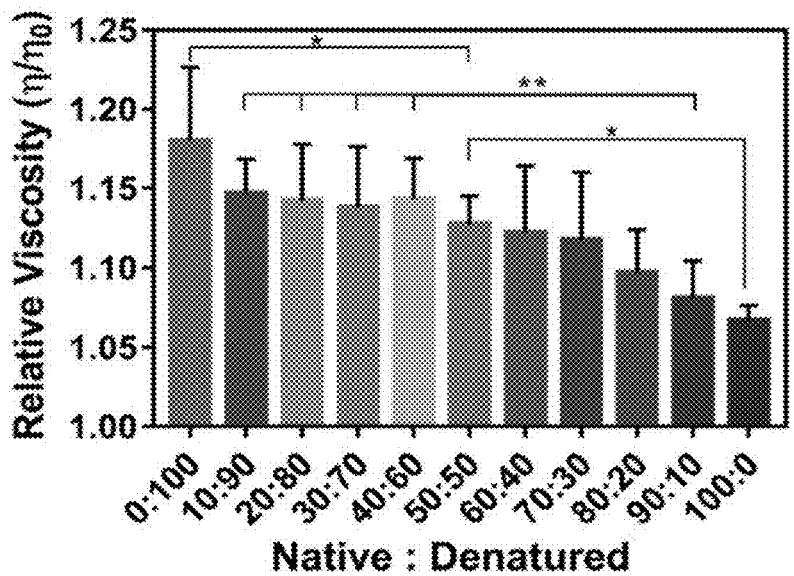
FIG. 6C shows the relative viscosity of different mixtures of native and denatured insulin in HEPES at pH 8.2 (v/v ratio). As the ratio of denatured insulin increases, the relative viscosity also increases. Note the relative viscosity on the y-axes is different between FIG. 6B and FIG. 6C (* indicates $p<0.05$,  $p<0.01$, * $p<0.001$, ** $p<0.0001$, n=9)

To determine the relative viscosity of the varying insulin mixtures PD measurements are performed in both PBS pH 2.5 and HEPES pH 8.2. As expected, the relative viscosity of insulin solutions increases as the percentage of denatured insulin increases (FIGS. 6B and 6C). Insulin solutions in PBS pH 2.5 (FIG. 6B) show a more dramatic change in protein viscosity between each v/v ratio when compared to insulin in HEPES pH 8.2 (FIG. 6C). This behavior is expected given our findings comparing exclusively denatured to exclusively native insulin solutions (FIGS. 5B and 5C). There is a significant difference in the relative viscosity of PBS insulin solutions starting at as little as 10% denatured insulin (p-value=$1\times10^{-19}$). From this, we calculated our lower limit of detection of insulin in PBS to be below the 90:10 native to denatured insulin mixture. The relative viscosity change is 0.21, compared to the 100:0 native to denatured insulin mixture (PD data found in Table 7). Therefore, in PBS the viscosity measurements reach the 95% threshold needed for biotherapeutic insulin. In solutions of insulin in HEPES at pH 8.2 we detect a difference in relative viscosity of solutions with 50:50 native to denatured insulin mixture when compared to 100:0 (relative viscosity change of 0.1, PD data found in Table 8). This relative viscosity produces a less statistically significant measurement between native: denatured measurements. Therefore, future optimization can be performed to increase sensitivity in the measurement signal, such as using smaller diameter particles (i.e. 100 nm) or increasing measurement times (i.e. more images to perform correlation) (Clayton, et al., *Biomicrofluidics* 2016, 10, 1-15).

TABLE 7

Relative Viscosity of Insulin Mixtures in PBS. Raw data values for the relative viscosity of native and denatured insulin combinations (denatured:native) suspended in 1X PBS pH 2.5 using PD (FIG. 6B).

| 100:0 | 90:10 | 80:20 | 70:30 | 60:40 | 50:50 | 40:60 | 30:70 | 20:80 | 10:90 | 0:100 |
|---|---|---|---|---|---|---|---|---|---|---|
| 2.87 ± 0.10 | 2.01 ± 0.20 | 1.88 ± 0.08 | 1.91 ± 0.11 | 1.73 ± 0.18 | 1.64 ± 0.28 | 1.61 ± 0.19 | 1.45 ± 0.11 | 1.35 ± 0.07 | 1.25 ± 0.02 | 1.01 ± 0.04 |

TABLE 8

Relative Viscosity of Insulin Mixtures in HEPES. Raw data values for the relative viscosity of native and denatured (denatured:native) insulin combinations suspended in 2.5 mM HEPES pH 8.2 using PD (FIG. 6C).

| 100:0 | 90:10 | 80:20 | 70:30 | 60:40 | 50:50 | 40:60 | 30:70 | 20:80 | 10:90 | 0:100 |
|---|---|---|---|---|---|---|---|---|---|---|
| 1.18 ± 0.05 | 1.15 ± 0.02 | 1.14 ± 0.04 | 1.14 ± 0.04 | 1.14 ± 0.03 | 1.13 ± 0.02 | 1.12 ± 0.04 | 1.12 ± 0.04 | 1.10 ± 0.03 | 1.08 ± 0.02 | 1.07 ± 0.01 |

TABLE 9

Figure 7:
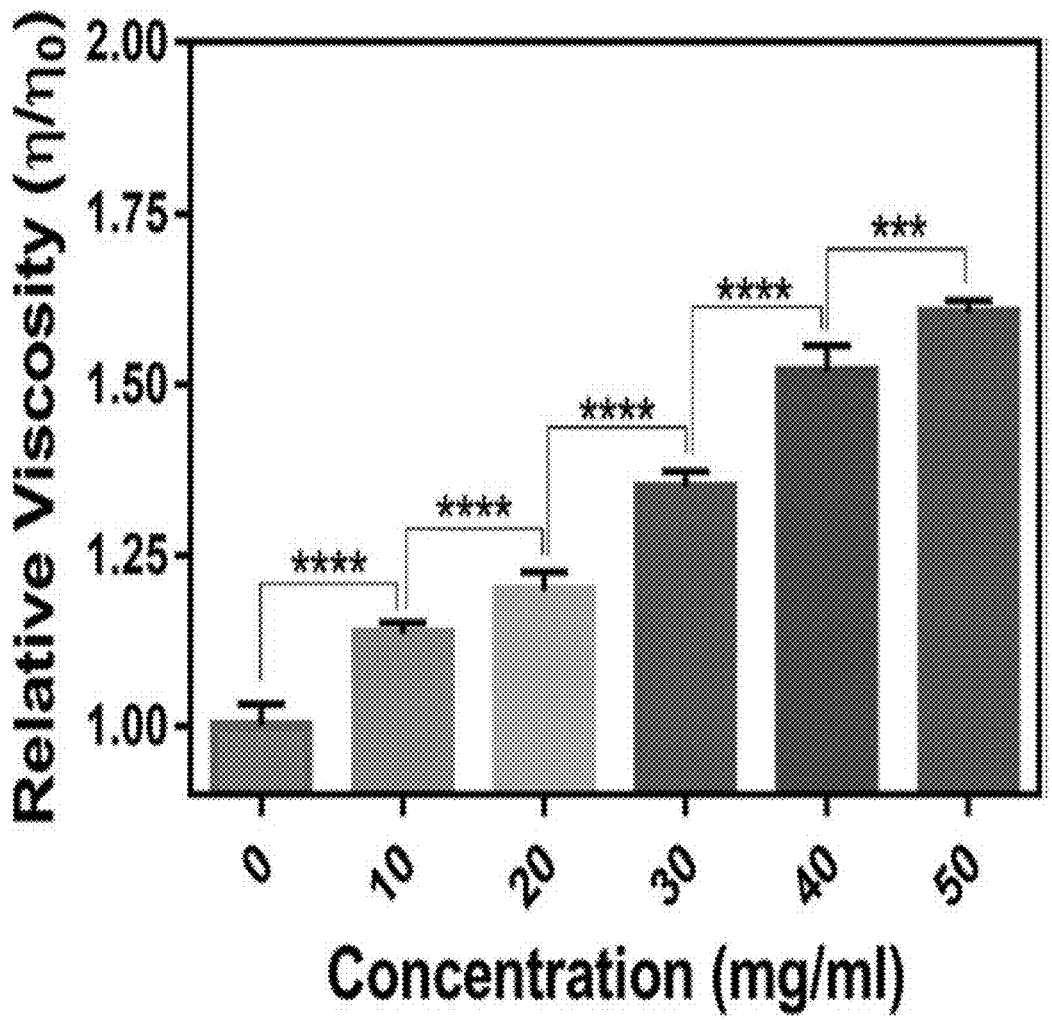
FIG. 7 shows the relative viscosity of an antibody. As the concentration of IgG antibody solution increases, the relative viscosity of the solution increases ($p<0.0001$, * $p<0.001$, n=9; measurements are relative to the buffer in which IgG is suspended in).

Relative Viscosity of IgG. Raw PD data
for the relative viscosity of IgG (FIG. 7).

| Concentration (mg/ml) | 0 | 10 | 20 | 30 | 40 | 50 |
|---|---|---|---|---|---|---|
| Native | 1.00 ± 0.03 | 1.14 ± 0.02 | 1.20 ± 0.03 | 1.35 ± 0.02 | 1.52 ± 0.04 | 1.61 ± 0.02 |

Monoclonal Antibody Viscosity

Monoclonal antibodies are stored at high concentrations for patient injection. These high concentrations lead to quite viscous solutions, which in turn cause issues with injecting the drug, requiring larger gauge needles and negatively affecting patient comfort. Viscous antibodies also cause difficulty in manufacturing handling, which is detrimental for efficient product output. With 70 mAb drugs expected to be on the market by 2020, there is an opportunity to design high throughput viscosity measurement systems for formulation development and upscale manufacturing. Antibodies have molecular weights typically around 150 kDa (with 2 light chains and 2 heavy chains), which is much larger than BSA and insulin. Because of this, native antibodies are more likely to cause changes in concentration than smaller biotherapeutic proteins. Therefore, we use PD to study the effect of increasing concentration of native IgG antibodies on solution viscosity (raw data presented in Table 9). As expected, there is a gradual increase in solution viscosity as the concentration of antibodies is increased (FIG. 7). Performing a t-test between each concentration (with a Bonferroni adjustment of a/n), there is statistically significant differences in the relative viscosity of each concentration measured ($p<0.0001$ and $p<0.001$). A change in concentration of around 10 mg/mL produces changes in solution viscosity of around 0.14±0.02, which is above our LLOD. This is promising because mAb therapeutics remain far above this concentration. Therefore, PD can be used to measure high concentrations of antibody solutions for downstream applications in mAb formulation characterization.

Plasmid DNA Viscosity

Figure 8A:
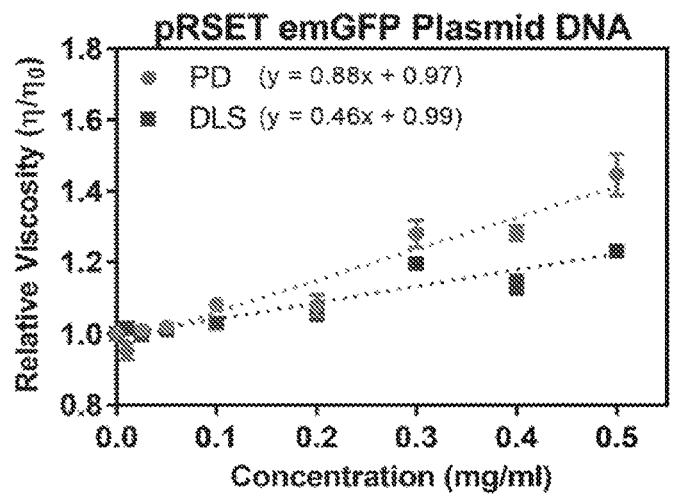
FIG. 8A shows relative solution viscosity was measured with PD and DLS as a function of increasing 3618 bp pRSET emGFP plasmid concentration.
Figure 8B:
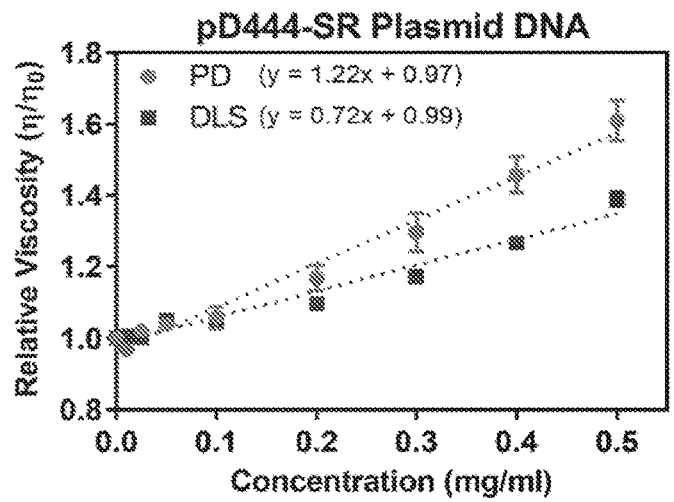
FIG. 8B shows Changes in solution viscosity as a function of circular plasmid DNA concentration by increasing 6162 bp pD444-SR plasmid concentration. Measurements were relative to QIAGEN elution buffer. n=3 independent experiments.
Figure 8C:
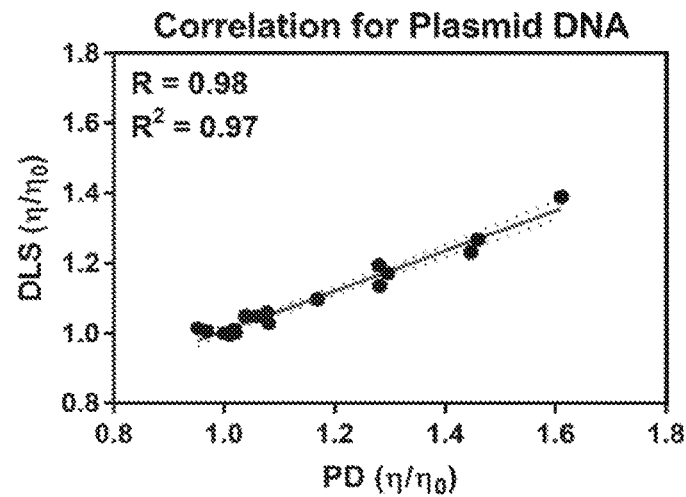
FIG. 8C demonstrates that DLS and PD measurements were highly positively correlated. Pearson Correlation Coefficient=0.98.

FIG. 8A shows relative solution viscosity was measured with PD and DLS as a function of increasing 3618 bp pRSET emGFP plasmid concentration. FIG. 8B shows Changes in solution viscosity as a function of circular plasmid DNA concentration by increasing 6162 bp pD444-SR plasmid concentration. Measurements were relative to QIAGEN elution buffer. n=3 independent experiments. FIG. 8C demonstrates that DLS and PD measurements were highly positively correlated. Pearson Correlation Coefficient=0.98.

Figure 9A:
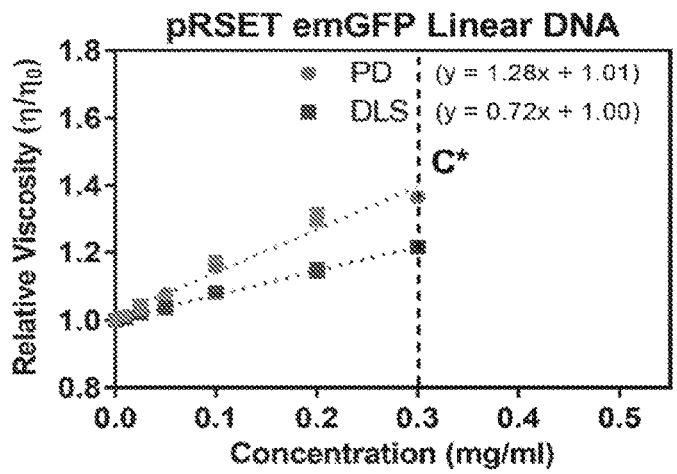
FIG. 9A shows relative solution viscosity as measured with PD and DLS as a function of increasing 3618 bp pRSET emGFP linear plasmid concentration.
Figure 9B:
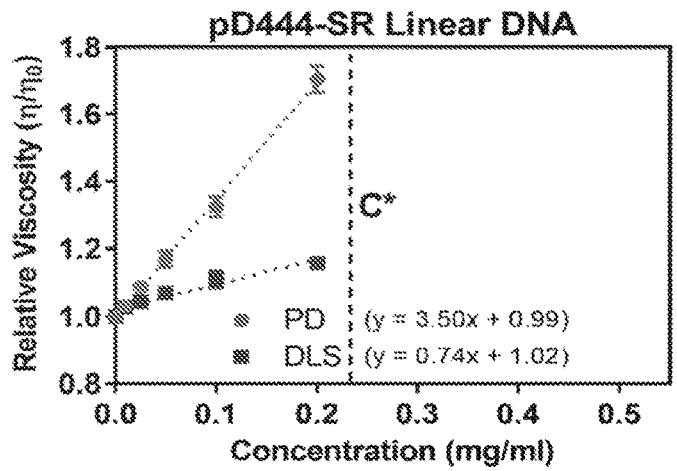
FIG. 9B describes Changes in solution viscosity as a function of linear plasmid DNA concentration by increasing 6162 bp pD444-SR linear plasmid concentration. DNA concentrations below the critical concentration are marked by a dotted line. Measurements are relative to QIAGEN elution buffer. n=3 independent experiments.
Figure 9C:
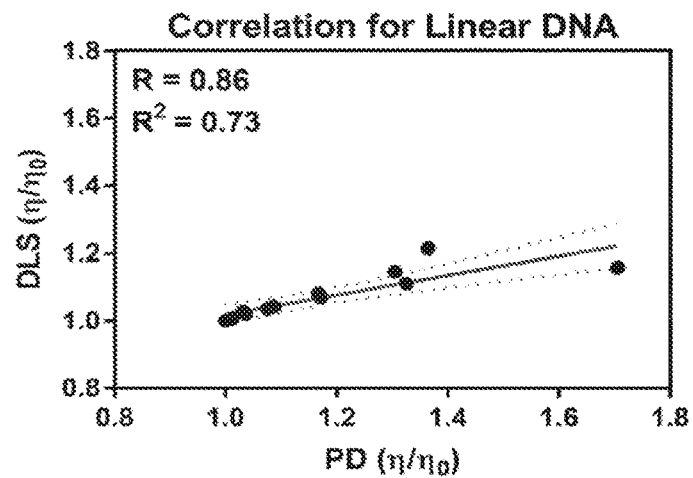
FIG. 9C demonstrates that DLS and PD measurements were highly positively correlated. Pearson Correlation Coefficient=0.85. The dashed lines indicate a 95% confidence interval.

FIG. 9A shows relative solution viscosity as measured with PD and DLS as a function of increasing 3618 bp pRSET emGFP linear plasmid concentration. FIG. 9B describes Changes in solution viscosity as a function of linear plasmid DNA concentration by increasing 6162 bp pD444-SR linear plasmid concentration. DNA concentrations below the critical concentration are marked by a dotted line. Measurements are relative to QIAGEN elution buffer. n=3 independent experiments. FIG. 9C demonstrates that DLS and PD measurements were highly positively correlated. Pearson Correlation Coefficient=0.85. The dashed lines indicate a 95% confidence interval.

To summarize, using particle diffusometry (PD), we have developed a method with which we can determine the degree of protein degradation. With PD we observe that native proteins show little-to-no change in viscosity up to concentration changes of approximately 10 mg/mL (FIGS. 3A-3B, 5A-5C and 7). This limit is likely to vary most with the size of the protein. However, heat denaturation of protein solutions produces measurable changes in sample viscosity as a function of increasing concentration (FIGS. 3A-3B and 5A-5C). This change in the viscosity occurs due to unfolding, aggregation of proteins during the denaturation process. As such, we observe that the concentration at which denatured insulin solutions exhibit viscosities significantly different from solutions with native protein is a function of solution buffer and pH (FIGS. 5A-5C). One important implication of these results is that quantitative measurements of protein degradation would require standards and controls with similar buffer formulations to be accurate. Regardless, these measurements are robust and allow for detection of as little as 10% denatured insulin in some formulations (FIGS. 6A-6C). These results are readily translated to other important biotherapeutic products, such as monoclonal antibodies, a significantly larger protein than insulin (FIG. 7) that are regularly administered to patients at high concentrations. As such, the viscosity of mAb solutions is a critically important parameter that affects the dosing strategy. Our measurements use sample volumes of 3 μL and imaging times of 8 seconds. Our current algorithms implemented on an Intel® Core™ i5-3230M CPU at 2.60 GHz computer processer require approximately 18 seconds per sample. Thus time-to-result per sample is as low as 30 seconds and could be optimized to run even faster. A tool like PD would enable rapid, high throughput, and low volume measurements of biotherapeutic formulations, and may be implemented for formulations research and development, or in manufacturing and distribution settings. We also envision PD-enabled point of care diagnostics for clinics and patients. Integration of PD with small handheld devices would enable pharmacists and patients to track the viability of their protein-based prescriptions. Implementation of particle diffusometry for measuring the viscosity of biotherapeutic solutions could be used to optimize pharmaceutical formulations, track biotherapeutic stability throughout the manufacturing and distribution chain, and be used in clinical settings as measure of the efficacy of a biotherapeutic. Implementing these methods could potentially decrease prescription waste, decrease incorrect drug use, mitigate adverse reactions in patients, and provide new means for patients to control their own health and prescription monitoring.

Those skilled in the art will recognize that numerous modifications can be made to the specific implementations described above. The implementations should not be limited to the particular limitations described. Other implementations may be possible.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A method for measuring viscosity or a change in viscosity of a liquid comprising biomolecules, the method comprising:
   preparing a testing solution that contains the liquid and uniformly sized particles having a uniform size within a range of about 50 to about 1,000 nm in diameter;
   capturing a plurality of images of the particles in the testing solution over a period of time;

identifying interrogation regions within each of the plurality of images;

correlating the interrogation regions of a sequential pair of first and second images of the plurality of images (cross-correlation) and correlating the interrogation regions of the first image with itself (autocorrelation);

determining a diffusion coefficient of the particles based on the cross-correlation and the autocorrelation; and calculating a viscosity of the liquid from the diffusion coefficient with Einstein's diffusion equation.

2. The method of claim 1, wherein the uniformly sized particles are made of structurally stable materials.

3. The method of claim 1, wherein the biomolecules are selected from the group consisting of nucleic acid, amino acid, lipid, peptide, protein, antibody, enzyme, carbohydrate, DNA, RNA, polysaccharide, oligonucleotide, oligosaccharide, proteoglycans, and glycoprotein.

4. The method of claim 3, wherein the biomolecules are biological therapeutics.

5. The method of claim 1, wherein the liquid is a biomolecular composition and the method is used for measuring structural and functional changes of the biomolecular composition from a standard of the biomolecular composition, the method comprising:

measuring viscosity of the biomolecular composition;

measuring viscosity of the standard of the biomolecular composition; and comparing viscosity of the biomolecular composition with that of the standard of the biomolecular composition, wherein finding of a substantial difference suggests structural and functional changes of the biomolecular composition.

6. A method for measuring structural and functional changes of a biomolecular composition from a standard of the biomolecular composition, the method comprising:

preparing a testing solution using the biomolecular composition with added uniformly sized particles having a uniform size within a range of about 50 to about 1,000 nm in diameter;

capturing a plurality of images of the particles of the testing solution over a period of time;

identifying interrogation regions within each of the plurality of images;

correlating the interrogation regions of a sequential pair of first and second images of the plurality of images (cross-correlation) and correlating the interrogation regions of the first image with itself (autocorrelation);

determining a diffusion coefficient based on the cross-correlation and the autocorrelation;

calculating a viscosity of the biomolecular composition from the diffusion coefficient with Einstein's diffusion equation;

obtaining a viscosity of the standard of the biomolecular composition by repeating the preparing, the capturing, the identifying, the correlating, the determining, and the calculating steps; and comparing viscosity of the biomolecular composition and that of the standard of the biomolecular composition, wherein finding of a substantial difference suggests structural and functional changes of the biomolecular composition.

7. The method of claim 6, wherein the biomolecular composition comprises a biomolecule selected from the group consisting of nucleic acid, amino acid, lipid, peptide, protein, antibody, enzyme, carbohydrate, DNA, RNA, polysaccharide, oligonucleotide, oligosaccharide, proteoglycans, and glycoprotein.

8. The method of claim 6, wherein the biomolecular composition comprises a combination of two or more of biomolecules selected from the group consisting of nucleic acid, amino acid, lipid, peptide, protein, antibody, enzyme, carbohydrate, DNA, RNA, polysaccharide, oligonucleotide, oligosaccharide, proteoglycans, and glycoprotein.

9. The method of claim 8, wherein the biomolecular composition is prepared by combining individual components.

10. The method of claim 6, wherein the biomolecular composition is derived from bodily fluids, cell cultures, environmental samples, air samples, water samples, soil samples, or other matrices that contain biomolecules.

11. The method of claim 6, wherein the biomolecular composition is derived from a living organism including prokaryotic cells, eukaryotic cells, viruses, or prions.

12. The method of claim 6, wherein the biomolecular composition is a therapeutic for treatment of a disease.

13. The method of claim 12, wherein the biomolecular composition is an insulin formulation.

14. The method of claim 12, wherein the biomolecular composition is an enzyme or an antibody formulation.

15. The method of claim 12, wherein the biomolecular composition is a peptide, protein or glycoprotein formulation.

16. A method for detecting presence of bacterial, viral, protozoa, fungal, or other parasitic contamination of a liquid, the method comprising:

preparing a testing solution using the liquid with added uniformly sized particles having a uniform size within a range of about 50 to about 1,000 nm in diameter;

capturing a plurality of images of the micro particles of the testing solution over a period of time;

identifying interrogation regions within each of the plurality of images;

correlating the interrogation regions of a sequential pair of first and second images of the plurality of images (cross-correlation) and correlating the interrogation regions of the first image with itself (autocorrelation);

determining a diffusion coefficient of the particles based on the cross-correlation and the autocorrelation;

calculating a viscosity of the liquid from the diffusion coefficient with Einstein's diffusion equation;

obtaining a viscosity of a non-contaminated standard of the liquid by repeating the preparing, the capturing, the identifying, the correlating, the determining, and the calculating steps; and comparing the viscosities of the liquid and the non-contaminated standard of the liquid, wherein finding of a substantial difference suggests presence of bacterial, viral, protozoa, fungal, or other parasitic contamination of the liquid.

17. The method of claim 16, wherein the liquid is for human or animal consumption.

18. The method of claim 16, wherein the liquid is selected from the group consisting of biological medicine, water, waste water of any source, fruit juice, vegetable juice, liquid food, and a liquid waste from a food or feed processing.

19. The method of claim 16, wherein the method is used for quality control of biological medicines, food and feeds during the process of manufacturing, distribution and consumption.

20. The method of claim 19, wherein the biological medicine is a biotherapeutic formulation.

* * * * *